(12) United States Patent
Kim et al.

(10) Patent No.: US 10,945,065 B2
(45) Date of Patent: *Mar. 9, 2021

(54) DISPLAY APPARATUS

(71) Applicant: LG Display Co., Ltd., Seoul (KR)

(72) Inventors: Kwangho Kim, Osan-si (KR); YeongRak Choi, Paju-si (KR); Sungtae Lee, Incheon (KR); Hogeol Lim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,604

(22) Filed: Apr. 17, 2020

(65) Prior Publication Data

US 2020/0245059 A1 Jul. 30, 2020

Related U.S. Application Data

(63) Continuation of application No. 15/993,799, filed on May 31, 2018, now Pat. No. 10,659,871.

(30) Foreign Application Priority Data

Nov. 13, 2017 (KR) ........................ 10-2017-0150670

(51) Int. Cl.
*H04R 1/28* (2006.01)
*H04N 5/64* (2006.01)
*H04R 1/02* (2006.01)

(52) U.S. Cl.
CPC .......... *H04R 1/2826* (2013.01); *H04N 5/642* (2013.01); *H04R 1/021* (2013.01); *H04R 2499/15* (2013.01)

(58) Field of Classification Search
CPC . H04R 1/28; H04R 1/02; H04R 1/025; H04R 1/028; H04R 1/288; H04R 2440/05; H04R 2499/15; H04R 7/045; H04N 5/642; H04N 5/64
USPC ................................ 381/388, 396, 400, 412
See application file for complete search history.

(56) References Cited

U.S. PATENT DOCUMENTS

| | | | |
|---|---|---|---|
| 2006/0140424 A1* | 6/2006 | Kobayashi | H04R 7/045 381/190 |
| 2008/0158445 A1* | 7/2008 | Yokawa | H04N 5/64 348/836 |
| 2014/0247959 A1 | 9/2014 | Yamanaka et al. | |
| 2015/0341714 A1* | 11/2015 | Ahn | H04M 1/03 381/333 |
| 2015/0382103 A1* | 12/2015 | Powell | H04R 1/02 381/338 |
| 2016/0186944 A1* | 6/2016 | Park | G09F 13/00 362/97.1 |
| 2017/0280216 A1 | 9/2017 | Lee et al. | |

* cited by examiner

*Primary Examiner* — Melur Ramakrishnaiah
(74) *Attorney, Agent, or Firm* — Morgan, Lewis & Bockius LLP

(57) ABSTRACT

Disclosed is a display apparatus including a display panel configured to display an image by emitting light, a rear surface structure configured to surround lateral and rear surfaces of the display panel, a vibration generating device connected with the rear surface structure and configured to vibrate the display panel, a rear sound emitting portion between the display panel and the rear surface structure, a rear sound guide between the display panel and the rear surface structure to surround the vibration generating device in a spiral shape and configured to connect with the rear sound emitting portion.

23 Claims, 6 Drawing Sheets

DISPLAY APPARATUS

CROSS REFERENCE TO RELATED APPLICATIONS

This application is a Continuation Application of U.S. patent application Ser. No. 15/993,799, filed on May 31, 2018, which claims the benefit of the Korean Patent Application No. 10-2017-0150670 filed on Nov. 13, 2017, both of which are hereby incorporated by reference as if fully set forth herein.

BACKGROUND

Field of the Disclosure

Embodiments of the present disclosure relate to a display apparatus.

Discussion of the Related Art

Generally, a display apparatus is widely used as a display screen for displaying an image in various devices such as electronic devices and home appliances, for example, televisions, monitors, notebook computers, smart phones, tablet personal computers (PC), electronic pads, wearable devices, watch phones, mobile information devices, navigation, vehicle control display devices, etc.

Generally, the display apparatus may include a display panel for displaying an image, and a sound device for outputting sound related with the displayed image.

However, in a typical display apparatus, the sound generated in the sound device travels toward a lower or rear portion of the display panel, which may cause deterioration of sound quality due to interference of the sound reflected on the wall or floor. Thus, this may cause difficulties in clear transmission of the sound, so that it disrupts a user's immersion.

SUMMARY

Accordingly, embodiments of the present disclosure are directed to a display apparatus that substantially obviates one or more problems due to limitations and disadvantages of the related art, and a method for driving the same.

An object of embodiments of the present disclosure is to provide a display apparatus capable of outputting sound to a region in front of the display panel.

Another object of embodiments of the present disclosure is to provide a display apparatus capable of realizing a wide low-pitched sound reproduction band and outputting a sound wave with a high sound pressure level.

To achieve these and other advantages and in accordance with the purpose of embodiments of the disclosure, as embodied and broadly described herein, there is provided a display apparatus that may include a display panel configured to display an image by emitting light, a rear surface structure configured to surround lateral and rear surfaces of the display panel, a vibration generating device connected with the rear surface structure and configured to vibrate the display panel, a rear sound emitting portion between the display panel and the rear surface structure, and a rear sound guide between the display panel and the rear surface structure to surround the vibration generating device in a spiral shape and configured to connect with the rear sound emitting portion.

It is to be understood that both the foregoing general description and the following detailed description of embodiments of the present disclosure are exemplary and explanatory and are intended to provide further explanation of the disclosure as claimed.

BRIEF DESCRIPTION OF THE DRAWINGS

The accompanying drawings, which are included to provide a further understanding of embodiments of the disclosure and are incorporated in and constitute a part of this application, illustrate embodiments of the disclosure and together with the description serve to explain the principles of embodiments of the disclosure. In the drawings.

DETAILED DESCRIPTION OF THE DISCLOSURE

Figure 1:
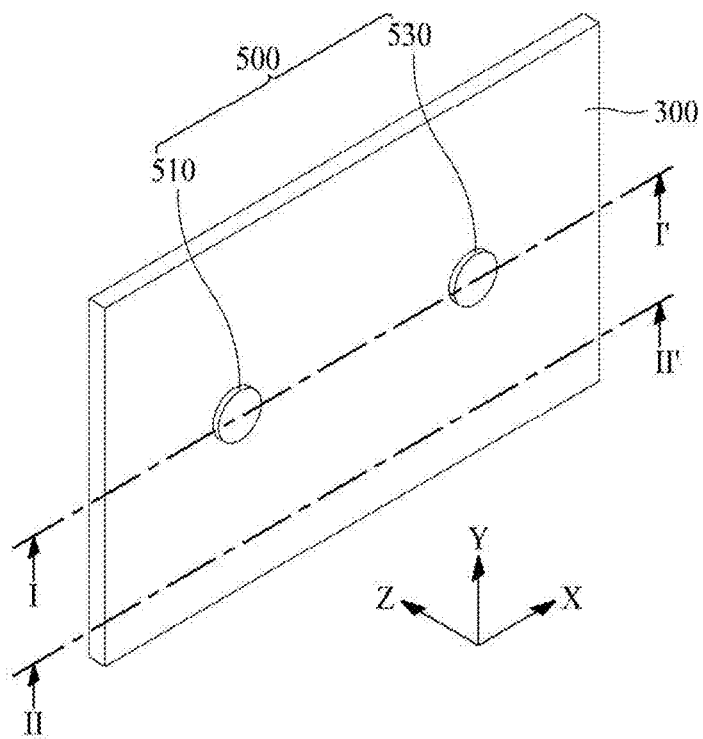
FIG. 1 is a rear view illustrating a display apparatus according to an example embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where "comprise", "have", and "include" described in the present disclosure are used, another part may be added unless "only~" is used. The terms of a singular form may include plural forms unless referred to the contrary.

In construing an element, the element is construed as including an error region although there is no explicit description.

In describing a position relationship, for example, when the positional order is described as "on~", "above~", "below~", and "next~", a case which is not contact may be included unless "just" or "direct" is used.

In describing a time relationship, for example, when the temporal order is described as "after~", "subsequent~", "next~", and "before~", a case which is not continuous may be included unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Also, it should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to an example embodiment of the present disclosure will be described in detail with reference to the accompanying drawings.

Figure 2:
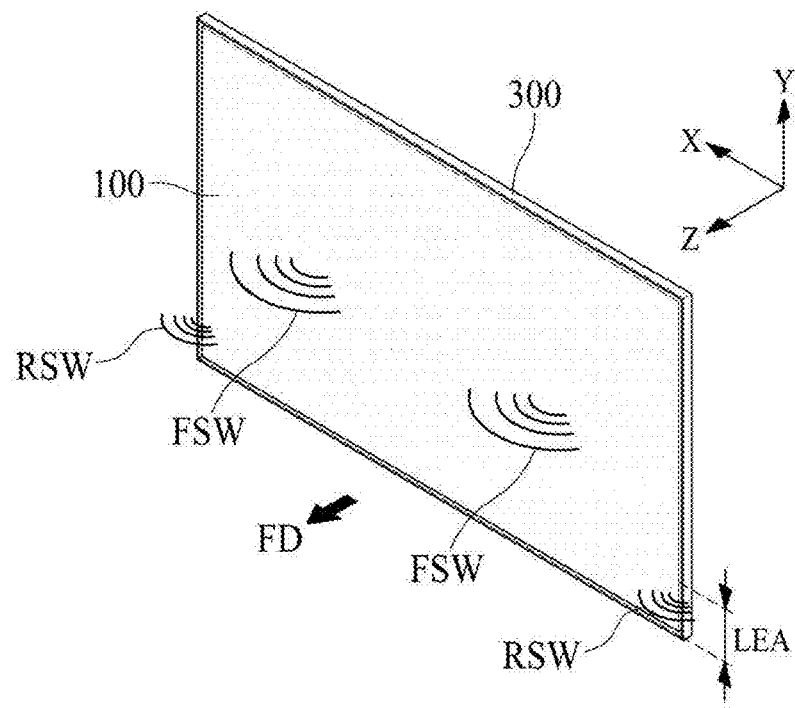
FIG. 2 illustrates a sound output of the display apparatus according to an example embodiment of the present disclosure.
Figure 3:
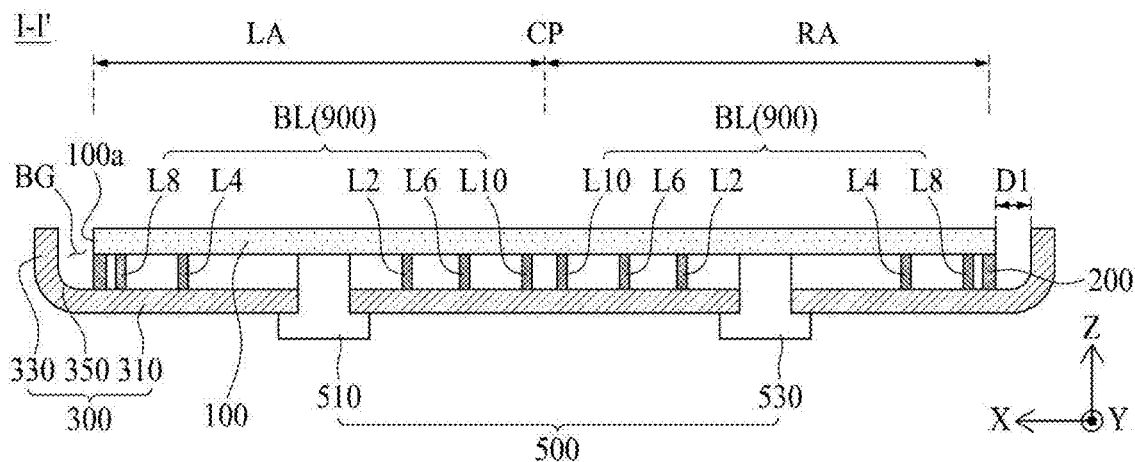
FIG. 3 is a cross sectional view taken along line I-I' of FIG. 1.
Figure 4:
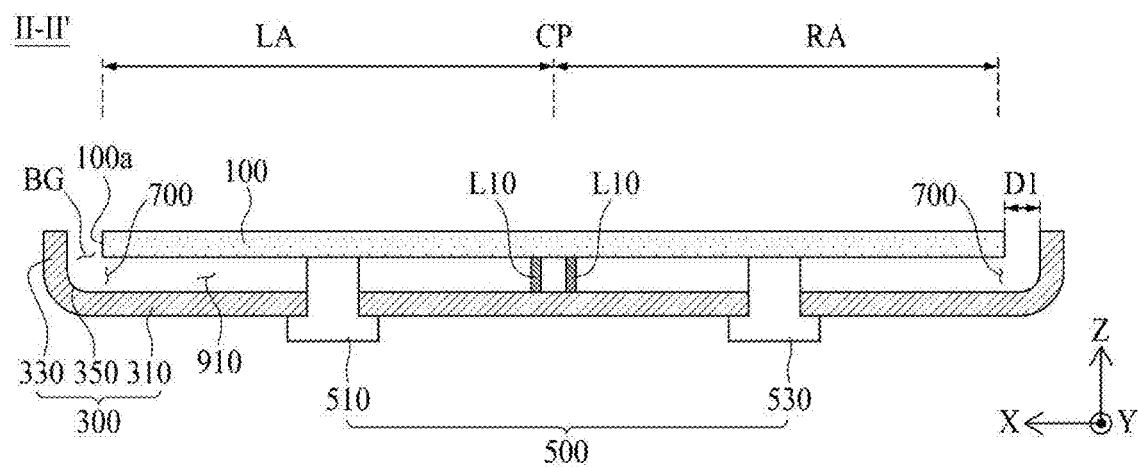
FIG. 4 is a cross sectional view taken along line II-II' of FIG. 1.

FIG. 1 is a rear view illustrating a display apparatus according to an example embodiment of the present disclosure. FIG. 2 illustrates a sound output of the display apparatus according to an example embodiment of the present disclosure. FIG. 3 is a cross sectional view taken line I-I' of FIG. 1. FIG. 4 is a cross sectional view taken line II-II' of FIG. 1.

With reference to FIGS. 1 to 4, the display apparatus according to an example embodiment of the present disclosure may include a display panel 100, a rear surface structure 300, a vibration generating device 500, a rear sound emitting portion 700, and a rear sound emission guide portion 900.

The display panel 100 for displaying an image is vibrated by the vibration generating device 500 disposed at its rear surface, and the display panel 100 outputs a front sound wave (FSW) generated by the vibration to a front direction (FD). Herein, the front sound wave (FSW) is output to the front direction (FD) in accordance with the vibration of the display panel 100, which may be referred to as a direct sound wave.

The display panel 100 according to an example embodiment of the present disclosure may be any type of flat display panel or curved display panel, for example, a liquid crystal display panel, an organic light emitting display panel, a quantum dot display device, a micro light emission diode display panel, and an electrophoresis display panel, but is not limited thereto. The display panel 100 according to the example embodiment of the present disclosure is not limited to a specific type, that is, the display panel 100 according to the example embodiment of the present disclosure may be any type of display panel capable of being vibrated by the vibration generating device 500 to generate a sound wave.

The display panel 100 according to an example embodiment of the present disclosure may include a thin film transistor array substrate having a plurality of pixels defined by a plurality of gate lines and a plurality of data lines, and a thin film transistor prepared in each pixel to drive each pixel, a pixel array layer having an emission device prepared on the thin film transistor array substrate, and an encapsulation substrate for covering the pixel array layer. Herein, the encapsulation substrate protects the thin film transistor and emission device from an external shock, and prevents moisture from being permeated into the emission device.

The rear surface structure 300 is disposed on the rear surface of the display panel 100, wherein the rear surface structure 300 supports the display panel 100. Also, the rear surface structure 300 supports and fixes the vibration generating device 500 disposed on the rear surface of the display panel 100.

The rear surface structure 300 according to an example embodiment of the present disclosure may be embodied in a cover bottom disposed on the rear surface of the display panel 100, or may be embodied in a middle cabinet provided to surround a lateral surface of the display panel 100, connected with the cover bottom, and provided to accommodate one edge of the display panel 100 to support the display panel 100. For example, the middle cabinet may have "⌐"-shaped cross section. The rear surface structure 300 may be embodied in the cover bottom, or the middle cabinet connected with the cover bottom, but is not limited thereto. The rear surface structure 300 may include any structure capable of supporting the rear surface of the display panel or surrounding both the rear and lateral surfaces of the display panel 100.

In this disclosure, the rear surface structure 300 may be expressed by other terms such as a housing, a cover bottom, a back cover, a base frame, a metal frame, a metal chassis, a chassis base, or a m-chassis. Thus, the rear surface structure 300 may be embodied in any type of frame which is used as a supporter for supporting the display panel 100, and is configured to surround the rear and lateral surfaces of the display apparatus.

The rear surface structure 300 according to an example embodiment of the present disclosure may include a rear surface cover portion 310, and a lateral surface cover portion 330.

The rear surface cover portion 310 covers the entire rear surface of the display panel 100 under the circumstances that a gap space is prepared between the rear surface cover portion 310 and the rear surface of the display panel 100. For example, the rear surface cover portion 310 may include at least one of glass, metal and plastic materials having a plate shape.

The lateral surface cover portion 330 is formed in the edge of the rear surface cover portion 310 to surround each lateral surface of the display panel 100. For example, the lateral surface cover portion 330 may be perpendicular to the edge of the rear surface cover portion 310, or may be inclined to be less than 90° with respect to the edge of the rear surface cover portion 310 to prepare a receiving space on the rear surface cover portion 330. Accordingly, the rear surface structure 300 may be a case shape having an open front surface and closed lateral and rear surfaces.

The lateral surface cover portion 330 is provided at a predetermined distance (D1) from each lateral surface 100a of the display panel 100. Accordingly, the display apparatus according to example embodiments of the present disclosure includes a border gap (BG) prepared between each lateral surface 100a of the display panel 100 and the lateral surface cover portion 330 of the rear surface structure 300. The border gap (BG) is disposed to surround each lateral surface 100a of the display panel 100. Thus, the border gap (BG) may be defined as a space for emitting the rear sound wave generated by the vibration of the display panel 100 to a front direction (FW) of the display panel 100.

The rear surface structure 300 according to an example embodiment of the present disclosure may further include a rounding portion 350 prepared between the lateral surface cover portion 330 and the rear surface cover portion 310. As the lateral surface cover portion 330 is bent in a curved-line shape having a predetermined curvature from the edge of the rear surface cover portion 310, the rounding portion 350 is prepared between the lateral surface cover portion 330 and the rear surface cover portion 310. The rounding portion 350 guides a traveling path of the rear sound wave, which travels toward the border gap (BG), toward the front direction (FW) of the display panel 100, to thereby reduce and/or minimize a re-reflection of the rear sound wave caused by the lateral surface cover portion 330. To this end, in one example, the lateral surface cover portion 330 is inclined at 90°~145° from the edge of the rear surface cover portion 310.

The rear surface structure 300 according to the example embodiment of the present disclosure may include at least one material of glass, plastic and metal materials. According to an example embodiment, the rear surface structure 300 of the glass material may be made of sapphire glass. According to another example embodiment, the rear surface structure 300 of the metal material may be formed of any one material among aluminum, aluminum alloy, magnesium alloy, and alloy of iron and nickel. According to another example embodiment, the rear surface structure 300 may be formed in a lamination structure of a glass plate and a metal plate, wherein the metal plate confronting the rear surface of the display panel 100 may be relatively thinner than the glass plate.

The rear surface structure 300 according to an example embodiment of the present disclosure may be connected with the rear edge of the display panel 100 by the use of panel connection member 200. The panel connection member 200 is disposed between the rear edge of the display panel 100 and the front edge of the rear surface structure 300 so that the display panel 100 and the rear surface structure 300 are adhered to each other by the use of panel connection member 200. The panel connection member 200 according to an example embodiment of the present disclosure may include a double-sided tape, double-sided adhesion foam pad, thermo-curing adhesive or photo-curing adhesive.

The vibration generating device 500, which is fixed to the rear surface structure 300, directly vibrates the display panel 100. The vibration generating device 500, which is disposed in the rear surface of the display panel 100, directly vibrates the display panel 100 so that the sound wave is output to the front direction (FD) of the display panel 100. For example, the vibration generating device 500 uses the display panel 100 as a vibration plate to generate the sound wave, whereby the vibration generating device 500 may be expressed as a sound generating device.

The vibration generating device 500 according to an example embodiment of the present disclosure is in contact with the rear surface of the display panel 100 through the rear surface structure 300. An upper portion of the vibration generating device 500 is inserted into a module insertion hole prepared in the rear surface structure 300, and is then connected with the rear surface of the display panel 100, and a lower portion of the vibration generating device 500 is fixed to the rear surface of the rear surface structure 300 while being in contact with the rear surface of the rear surface structure 300. Accordingly, the vibration generating device 500 is vibrated in accordance with a sound signal which is related or not related with a displayed image under the condition that the rear surface structure 300 is used as a supporter, and the display panel 100 is vibrated in accordance with the vibration of the vibration generating device 500, whereby the sound wave generated in accordance with the vibration of the display panel 100 is directly output to the front direction (FD) of the display panel 100.

The vibration generating device 500 according to an example embodiment of the present disclosure may include a first vibration generating module 510 and a second vibration generating module 530.

The first vibration generating module 510 is in contact with a left area (LA) of the rear surface of the display panel 100 with respect to a central portion (CP) of a first direction (X, or transverse direction) of the display panel 100, to thereby vibrate the left area (LA) of the display panel 100. The first vibration generating module 510 according to an example embodiment of the present disclosure may be in contact with the central portion of the left area (LA) on the rear surface of the display panel 100.

The second vibration generating module 530 is in contact with a right area (RA) of the rear surface of the display panel 100, to thereby vibrate the right area (RA) of the display panel 100. The second vibration generating module 530 according to an example embodiment of the present disclosure may be in contact with the central portion of the right area (LA) on the rear surface of the display panel 100.

Each of the first vibration generating module 510 and the second vibration generating module 530 according to an example embodiment of the present disclosure may be a speaker, actuator, exciter, transducer or piezoelectric device, but are not limited thereto. For example, each of the first vibration generating module 510 and the second vibration generating module 530 according to an example embodiment of the present disclosure may be any sound generating device capable of outputting sound wave in accordance with an electric signal. Selectively, each of the first vibration generating module 510 and the second vibration generating module 530 according to an example embodiment of the present disclosure may include at least two of sub vibration generating modules spaced apart from each other and disposed to be parallel to each other.

The rear sound emitting portion 700 is prepared between the display panel 100 and the rear surface structure 300, whereby the border gap (BG) prepared along the lateral surface of the display panel 100 is connected with a space prepared between the display panel 100 and the rear surface structure 300. That is, the rear sound emitting portion 700 is connected with (in communication with) a rear sound traveling path prepared by the rear sound emission guide portion 900 disposed between the display panel 100 and the rear surface structure 300, whereby the rear sound emitting portion 700 may be defined as an end opening portion of the rear sound traveling path prepared by the rear sound emission guide portion 900. The rear sound emitting portion 700 according to an example embodiment of the present disclosure may be prepared by removing the panel adhesion member 200 overlapped with some areas of both edges of the display panel 100 which is parallel to a second direction (Y, vertical direction) perpendicular to the first direction (X) of the display panel 100. For example, the rear sound emitting portion 700 may be prepared by removing the panel adhesion member 200 overlapped with lower edge portions (LEA) of the left and right edges of the display panel 100 by a predetermined distance, but is not limited thereto. The rear sound emitting portion 700 may be prepared by removing the panel adhesion member 200 overlapped with upper edge portions of the left and right edges of the display panel 100 by a predetermined distance.

The rear sound emission guide portion 900 is prepared between the display panel 100 and the rear surface structure 300 to surround the vibration generating device 500 in a spiral shape, and is connected with the rear sound emitting portion 700. While the rear sound emission guide portion 900 is connected with the rear sound emitting portion 700, the vibration generating device 500 is surrounded at least one time by the rear sound emission guide portion 900. The rear sound emission guide portion 900 has a spiral shape with respect to the vibration generating device 500 between the display panel 100 and the rear surface structure 300, and prepares a rear sound guide path 910 connected with the rear sound emitting portion 700. In this case, air, which is in a space between the display panel 100 and the rear surface structure 300, is discharged through the rear sound emitting portion 700, whereby the rear sound emitting portion 700 may be expressed as a rear sound wave pipe. The rear sound emission guide portion 900 provides the rear sound guide path 910 of the spiral shape for guiding the rear sound wave (RSW), which is generated by the vibration of the display panel 100 in accordance with the driving of the vibration generating device 500, to the front direction (FD) of the display panel 100 through the rear sound emitting portion 700, to thereby increase a low-pitched sound reproduction band. In this case, a phase of the rear sound wave (RSW) emitted to the front direction (FW) of the display panel 100 through the rear sound emission guide portion 900 and the rear sound emitting portion 700 is the same as a phase of the front sound wave (FSW) which is output from the display panel 100 in accordance with the vibration of the display panel 100 so that it is possible to increase a low-pitched sound reproduction band of the sound wave which is output from the display apparatus, and also to increase a sound pressure level.

Accordingly, the display apparatus according to an example embodiment of the present disclosure includes the rear sound emission guide portion 900 configured to surround the vibration generating device 500, which is disposed between the display panel 100 and the rear surface structure 300, in the spiral shape so that the rear sound wave (RSW) generated by the vibration of the display panel 100 in accordance with the driving of the vibration generating device 500 by the use of rear sound emission guide portion 900 is emitted to the front direction (FD) of the display panel 100 through the rear sound emitting portion 700, to thereby realize a wide low-pitched sound reproduction band and the output of sound with a high sound pressure level.

Figure 5:
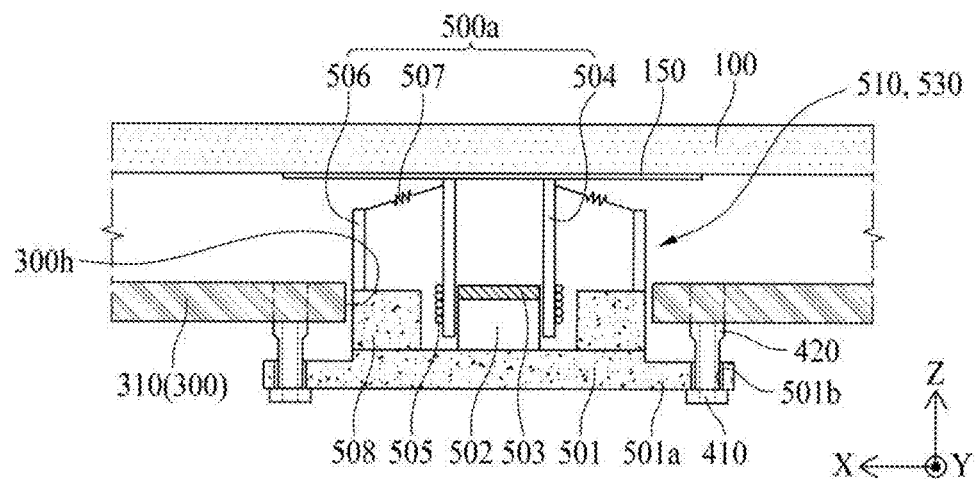
FIG. 5 illustrates a vibration generating module of a vibration generating device according to an example embodiment of the present disclosure.

FIG. 5 illustrates the vibration generating module of the vibration generating device according to an example embodiment of the present disclosure. With reference to FIG. 5, the vibration generating module 510 and 530 according to an example embodiment of the present disclosure is configured to vibrate the display panel 100 in accordance with a current (or voice current) applied based on Fleming's left hand rule.

The vibration generating module 510 and 530 according to an example embodiment of the present disclosure may be formed of an actuator disposed to be in contact with the rear surface of the display panel 100. The vibration generating module 510 and 530 of the actuator may include a module frame 501, a magnet 502, a center pole 503, a bobbin 504, a coil 505, an external frame 506, and a damper 507.

The module frame 501 is fixed to the rear surface structure 300, and is partially inserted into a module insertion hole 300h prepared in the rear surface cover portion 310 of the rear surface structure 300. As a predetermined area of an upper portion of the module frame 501 is inserted into the module insertion hole 300h, the module frame 501 is disposed in a gap space between the display panel 100 and the rear surface structure 300 with respect to a thickness direction (Z) of the display panel 100. A predetermined gap is prepared between the module frame 501 and the module insertion hole 300h. This predetermined gap serves as a vent for a smooth circulation of the air in a gap space (GS) for the vibration of the display panel 100, and also functions as an outlet for discharging noise ingredients generated by driving the vibration generating module 510 and 530 except the sound pressure in accordance with the vibration of the display panel 100.

The module frame 501 according to an example embodiment of the present disclosure includes a frame fixing portion 501a. The frame fixing portion 501a, which protrudes from a lateral surface of the module frame 501, is overlapped with the rear surface cover portion 310 of the rear surface structure 300 being adjacent to the module insertion hole 300h.

The frame fixing portion 501a according to an example embodiment of the present disclosure may be fixed to the rear surface cover portion 310 of the rear surface structure 300 by the use of bolt 410 and nut 420.

The nut 420 according to an example embodiment of the present disclosure may be embodied in a self-clinching nut fixed to the rear surface cover portion 310 of the rear surface structure 300. The self-clinching nut according to an example embodiment of the present disclosure may include a PEM® nut. If the nut 420 is a self-clinching nut such as the PEM® nut, the vibration generated in the vibration generating module 510 and 530 is partially absorbed in the nut 420 so that it may possible to reduce the vibration transferred to the rear surface cover portion 310 of the rear surface structure 300. The bolt 410 according to an example embodiment of the present disclosure may be coupled with the nut 420 through the frame fixing portion 510a.

The frame fixing portion 501a according to another example embodiment of the present disclosure may be fixed to the rear surface cover portion 310 of the rear surface structure 300 by the use of an adhesion member such as a double-sided tape. In this case, the adhesion member serves as a kind of a damper in accordance with its elasticity and thickness so that it may be possible to reduce and/or minimize a transfer of the vibration, which is generated by driving the vibration generating module 510 and 530, to the rear surface cover portion 310 of the rear surface structure 300.

The magnet 502 may be expressed by a magnetic circuit unit or vibrating portion 500a for vibrating the display panel 100 as the center pole 503, the bobbin 504 and the coil 505 are provided in the module frame 501.

The magnetic circuit unit according to an example embodiment of the present disclosure may have an external type (or dynamic type) where the magnet 502 is disposed outside the coil 505, or may have an internal type where the magnet 502 is disposed inside the coil 505. The vibration generating module 510 and 530 of the internal type may advantages of small leakage magnetic flux and decreased entire size of the vibration generating device. The display apparatus according to an example embodiment of the present disclosure may include the external type or internal type vibration generating module 510 and 530. Hereinafter, it is assumed that the internal type vibration generating module 510 and 530 is included.

The magnet 502 may be a permanent magnet. The magnet 502 according to an example embodiment of the present disclosure may use a sintered magnet of barium ferrite, and the magnet 502 may be formed of ferric oxide ($Fe_2O_3$), barium carbonate ($BaCO_3$), neodymium (Nd) magnet, strontium ferrite with improved magnetism, aluminum (Al), nickel (Ni), or alloy-casting magnet of cobalt (Co), but is not limited thereto. The magnet 502 may have a ring shape.

The bobbin 504 is received in or inserted into the magnet 502. For example, as the bobbin 504 is inserted into the inside of the magnet 502, the circumferential surface of the bobbin 504 is surrounded by the magnet 502. The bobbin 504 according to an example embodiment of the present disclosure may be a structure of a pulp or paper worked material, aluminum, magnesium, an alloy of aluminum and magnesium, synthetic resin of polypropylene, or polyamide-based fiber. The bobbin 504 according to an example embodiment of the present disclosure may have a circle or oval shape, but is not limited thereto. In comparison to the circle-shaped bobbin, the oval-shaped bobbin 504 may improve high-pitched sound quality and heat dissipation characteristics by reducing heat generated in accordance with the vibration.

The coil 505 is wound to surround a lower circumferential surface of the bobbin 504, and an externally-provided voice current is supplied to the coil 505. The coil 505 is elevated together with the bobbin 504. Herein, the coil 505 may be expressed as a voice coil. If a current is applied to the coil 505, the entire bobbin 504 is guided by the center pole 503 and is moved in an up-and-down direction in accordance with Fleming's left hand rule based on an applied magnetic field formed around the coil 505 and an external magnetic field formed around the magnet 502.

Meanwhile, a front surface (or fore end) of the bobbin 504 is in contact with the rear surface of the display panel 100. Thus, the bobbin 504 vibrates the rear surface of the display panel 100 according to whether the current is applied or not, and the sound wave is generated by the vibration of the display panel 100.

Additionally, the bobbin 504 may include a bobbin protection member. The bobbin protection member is disposed in the front surface of the bobbin 504, and the bobbin protection member transfers the movement (or vibration) of the bobbin 504 to the rear surface of the display panel 100. The bobbin protection member according to an example embodiment of the present disclosure may be a plate member of a ring shape attached to the front surface of the bobbin 504, a circular plate member for covering the front surface of the bobbin 504, or a cap member for covering the fore end of the bobbin 504.

The center pole 503 is received in or inserted into the bobbin 504, to thereby guide the movement of the bobbin 504. For example, as the center pole 503 is inserted into the inside of the bobbin 504 having a cylinder shape, the circumferential surface of the center pole 503 is surrounded by the bobbin 504. In this case, the center pole 503 may be expressed as an elevating guider or pole pieces.

Additionally, the magnetic circuit unit according to an example embodiment of the present disclosure may further include an upper plate 508. The upper plate 508 is connected with the edge portion of the module frame 501 to surround the coil 505 disposed in the module frame 501. The upper plate 508 according to an example embodiment of the present disclosure may be formed of a magnetic material such as iron (Fe). The module frame 501 and the upper plate 508 are not limited to these terms, that is, they may be expressed by other terms such as yokes.

The external frame 506 may be provided while being perpendicular to the front edge of the module frame 501 or the front edge of the upper plate 508. The external frame 506 supports the damper 507.

The damper 507 is provided between the external frame 506 and the magnetic circuit unit. For example, the damper 507 may be provided between the external frame 501 and the bobbin 504 of the magnetic circuit unit. The damper 507 may be expressed by other terms such as a spider, suspension or edge.

One end of the damper 507 according to an example embodiment of the present disclosure may be connected with the external frame 506, and the other end of the damper 507 may be connected with the upper outer surface of the bobbin 504. The damper 507 is formed in a wrinkled structure between its both ends, whereby the damper 507 controls the up-and-down vibration of the bobbin 504 by contraction and relaxation movements in accordance with the up-and-down movement of the bobbin 504. As the damper 507 is connected between the bobbin 504 and the external frame 506, the damper 507 controls a vibration distance of the bobbin 504 by a restoring force. For example, if the bobbin 504 vibrates to be higher or lower than a predetermined distance, the bobbin 504 may be restored to its original position by the restoring force of the damper 507.

Selectively, the vibration generating module 510 and 530 according to the example embodiment of the present disclosure may include two or more sub vibration generating modules spaced apart from each other and disposed to be parallel to each other. Each sub vibration generating module has the same structure as that of the aforementioned vibration generating module 510 and 530.

Meanwhile, the display apparatus according to an example embodiment of the present disclosure may further include a heat dissipation member 150. The heat dissipation member 150 is attached to the rear surface of the display panel 100 overlapped with the vibration generating module 510 and 530. The heat dissipation member 150 may be connected with the bobbin 504 of the vibration generating module 510 and 530 or may be connected with the bobbin protection member by the use of a connection member. The heat dissipation member 150 is disposed with respect to the center of the vibration generating module 510 and 530 so that heat generated for the driving of the vibration generating module 510 and 530 is diffused to the display panel 100, to thereby prevent deterioration of the vibration generating module 510 and 530. The heat dissipation member 150 according to an example embodiment of the present disclosure may be formed of a metal material with high thermal conductivity, for example, aluminum (Al), copper (Cu), silver (Ag), magnesium (Mg), or their alloys. Herein, the heat dissipation member 150 may be expressed by other terms such as a heat sink, heat-dissipation sheet, heat-dissipation layer, or heat-dissipation plate.

The vibration generating module 510 and 530 according to an example embodiment of the present disclosure vibrates the display panel 100 so that the sound wave generated in accordance with the vibration of the display panel 100 is output to the front direction (FD).

Figure 6:
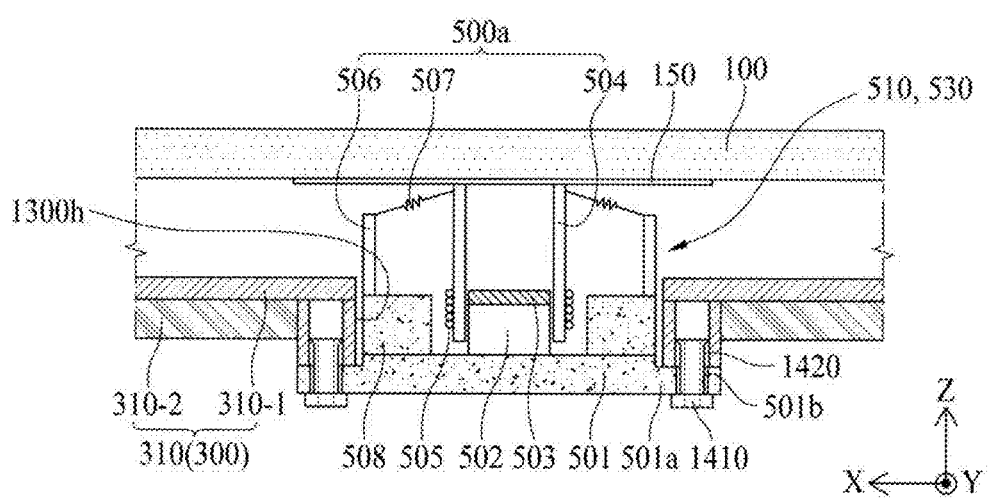
FIG. 6 illustrates a connection structure between a rear surface cover portion and a vibration generating module in a display apparatus according to another example embodiment of the present disclosure.

FIG. 6 illustrates a connection structure between a rear surface cover portion and a vibration generating module in a display apparatus according to another example embodiment of the present disclosure, which is obtained by changing the rear surface cover portion of the rear surface structure, and the connection structure between the rear surface cover portion and the vibration generating module.

With reference to FIG. 6, in the case of the display apparatus according to another example embodiment of the present disclosure, the rear surface cover portion 310 of the rear surface structure 300 may include a first rear surface cover 310-1, and a second rear surface cover 310-2.

The first rear surface cover 310-1 for covering a rear surface of a display panel 100 is connected with first and second vibration generating modules 510 and 520 of a vibration generating device. The first rear surface cover 310-1 according to an example embodiment of the present disclosure may be a metal plate of a metal material. For example, the first rear surface cover 310-1 may include an aluminum (Al) material with good thermal conductivity.

The second rear surface cover 310-2 for covering a rear surface of the first rear surface cover 310-1 is formed of the different material from that of the first rear surface cover 310-1. The second rear surface cover 310-2 according to an example embodiment of the present disclosure may be a plate member of a glass material or a stainless steel material.

The first rear surface cover 310-1 may be connected with a front surface of the second rear surface cover 310-2 by the use of a cover adhesion member. The cover adhesion member according to an example embodiment of the present disclosure may be wholly interposed between the first rear surface cover 310-1 and the second rear surface cover 310-2. In this case, the cover adhesion member may be adhesion resin. In case of the cover adhesion member according to another example embodiment of the present disclosure, the first rear surface cover 310-1 and the second rear surface cover 310-2 are disposed at a predetermined interval from each other, whereby a predetermined gap is prepared between the first rear surface cover 310-1 and the second rear surface cover 310-2. In this case, the cover adhesion member may be a double-sided tape or double-sided adhesion foam pad, which has elasticity for absorbing a shock.

The rear surface structure 300 according to the example embodiment of the present disclosure includes the first rear surface cover 310-1 of a metal material which is capable of being easily connected with the vibration generating module 510 and 530, and the second rear surface cover 310-2 of a glass material or stainless steel material which is capable of realizing good design of the display apparatus.

The vibration generating module 510 and 530 according to the example embodiment of the present disclosure may include a module frame 501, a magnet 502, a center pole 503, a bobbin 504, a coil 505, an external frame 506, and a damper 507.

The module frame 501 is fixed to the first rear surface cover 310-1 of the rear surface structure 300. According as a predetermined area of an upper portion of the module frame 501 is inserted into a module insertion hole 1300h, the module frame 501 is disposed in a gap space between the display panel 100 and the rear surface structure 300 with respect to a thickness direction (Z) of the display panel 100. Herein, the module insertion hole 1300h penetrates through the first rear surface cover 310-1 and the second rear surface cover 310-2.

The module frame 501 according to an example embodiment of the present disclosure includes a frame fixing portion 501a. The frame fixing portion 501a, which protrudes from a lateral surface of the module frame 501, is overlapped with the first rear surface cover 310-1 of the rear surface structure 300 being adjacent to the module insertion hole 1300h.

The frame fixing portion 501a according to an example embodiment of the present disclosure may be connected with the first rear surface cover 310-1 of the rear surface structure 300 by the use of bolt 1410 and nut 1420.

The nut 1420 according to an example embodiment of the present disclosure may be embodied in a self-clinching nut fixed to the first rear surface cover 310-1 of the rear surface structure 300. The self-clinching nut according to an example embodiment of the present disclosure may include a PEM® nut. If the nut 1420 is formed of the PEM® nut, the vibration generated in the vibration generating module 510 and 530 is partially absorbed in the nut 1420 so that it may be possible to reduce the vibration transferred to the rear surface cover portion 310 of the rear surface structure 300. The bolt 1410 according to an example embodiment of the present disclosure may be coupled with the nut 1420 through the frame fixing portion 501a.

The magnet 502, the center pole 503, the bobbin 504, the coil 505, the external frame 506, and the damper 507 are the same as those of FIG. 5, whereby the same reference numbers will be used throughout the drawings to refer to the same or like parts, and a detailed description for the same parts will be omitted.

Selectively, the vibration generating module 510 and 530 according to the example embodiment of the present disclosure may include two or more sub vibration generating modules spaced apart from each other and disposed to be parallel to each other. Each sub vibration generating module has the same structure as that of the aforementioned vibration generating module 510 and 530.

The vibration generating module 510 and 530 according to the example embodiment of the present disclosure is connected with the first rear surface cover 310-1 of the rear surface structure 300 so that the vibration generating module 510 and 530 is closely adhered to the rear surface of the display panel 100 by a thickness of the second rear surface cover 310-2. Accordingly, it may be possible to decrease a thickness of the display apparatus by the thickness of the second rear surface cover 310-2.

Figure 7:
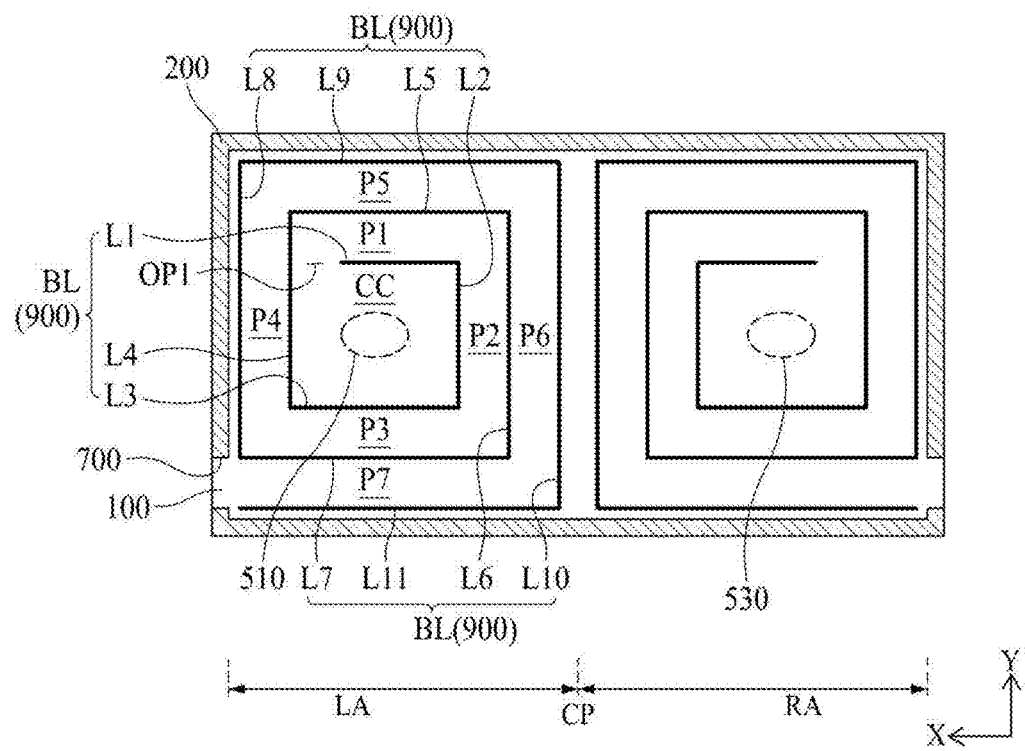
FIG. 7 illustrates a rear sound guide member according to an example embodiment of the present disclosure.

FIG. 7 illustrates a rear sound guide member according to an example embodiment of the present disclosure. With reference to FIG. 7 in connection with FIGS. 2 to 4, the rear sound emission guide portion 900 according to the example embodiment of the present disclosure may include a bulkhead line (BL) (or barrier line) of a spiral shape having a straight line or curved line so as to surround each of the first vibration generating module 510 and the second vibration generating module 530.

The bulkhead line (BL) may have a constant width and height. For example, the bulkhead line (BL) may be formed of a double-sided tape or double-sided adhesion foam pad having a constant width and height. In this case, the height of the bulkhead line (BL) may be the same as the height of the panel adhesion member 200. A front surface of the bulkhead line (BL) is attached to the rear surface of the display panel 100, and a rear surface of the bulkhead line (BL) is attached to the rear surface cover portion 310 of the rear surface structure 300.

The bulkhead line (BL) according to an example embodiment of the present disclosure may include first to (n)th straight-line portions (L1~L11, herein, 'n' is an integer of 5 or more than 5) disposed in the spiral shape so as to surround the vibration generating module 510 and 530.

Among the first to (n)th straight-line portions (L1~L11), the (i+1)th straight-line portion (Li+1, herein, 'i' is an integer of 1~'n–1') is bent from an end of the (i)th straight-line portion (Li). The (i+1)th straight-line portion (Li+1) may be bent at 90° from an end of the (i)th straight-line portion (Li). In this case, a length of the (i+1)th straight-line portion (Li+1) is larger than a length of the (i)th straight-line portion (Li) so that the bulkhead line (BL) surrounds the vibration generating device 510 and 530, that is, a vibrating portion of the vibration generating module 510 and 530 in the spiral shape. Accordingly, the (i)th straight-line portion (Li) and the (i+2)th straight-line portion (Li+2) are disposed while being parallel to each other, and the (i+1)th straight-line portion (Li+1) and the (i+3)th straight-line portion (Li+3) are disposed while being parallel to each other. For example, a length of the (i+1)th straight-line portion (Li+1) may be larger than a length of the (i)th straight-line portion (Li) by an interval between the straight-line portions being adjacent to each other along the first direction (X) or second direction (Y). The odd-numbered straight-line portion among the first to (n)th straight-line portions (L1~L11) is parallel to the first direction X (or second direction Y), and the even-numbered straight-line portion among the first to (n)th straight-line portions (L1~L11) may be parallel to the second direction Y (or first direction X).

For example, the bulkhead line (BL) may include the first to eleventh straight-line portions (L1~L11). As the first to eleventh straight-line portions (L1~L11) are disposed to surround the vibration generating module 510 and 530 in the spiral shape, the bulkhead line (BL) prepares the rear sound guide path 910 of the spiral shape having first to seventh sound paths (P1~P7) with the different straight-line lengths. In this case, the rear sound guide path 910 may be expressed as a rear sound guide pipe, and the sound path (P1~P7) may be expressed as a sound pipe or duct.

Hereinafter, an arrangement structure of the rear sound emission guide portion 900 surrounding the straight-line portions of the vibrating portion 500a of the first vibration generating module 510 in the spiral shape, that is, the first to eleventh straight-line portions (L1~L11) will be described in detail as follows.

The first straight-line portion (L1) is disposed at an upper side of the first vibration generating module 510 while being parallel to the first direction (X), the second straight-line portion (L2) is bent from an end of the first straight-line portion (L1) while being parallel to the second direction (Y), and is disposed at a right side of the first vibration generating module 510, the third straight-line portion (L3) is bent from an end of the second straight-line portion (L2) and is disposed at a lower side of the first vibration generating module 510 while being parallel to the first straight-line portion (L1) under the condition that the first vibration generating module 510 is disposed in-between, and the fourth straight-line portion (L4) is bent from an end of the third straight-line portion (L3) and is disposed at a left side of the first vibration generating module 510 while being parallel to the second straight-line portion (L2) under the condition that the first vibration generating module 510 is disposed in-between. Each of the first to fourth straight-line portions (L1, L2, L3, L4) is disposed at the same interval from the first vibration generating module 510 so as to surround once the first vibration generating module 510, to thereby prepare a cavity chamber (CC) in the periphery of the first vibration generating module 510. In this case, the cavity chamber (CC) has a first opening (OP1) prepared between the first straight-line portion (L1) and the fourth straight-line portion (L4) so that the cavity chamber (CC) has a case shape whose left upper portion is partially open on a plane structure. Accordingly, the rear sound wave generated in the cavity chamber (CC) in accordance with the vibration of the display panel 100 by the driving of the first vibration generating module 510 may be emitted or transferred from the cavity chamber (CC) to the rear sound emitting portion 700 through the first opening (OP1).

The fifth straight-line portion (L5) is bent from an end of the fourth straight-line portion (L4) while being parallel to the first straight-line portion (L1), and the fifth straight-line portion (L5) is disposed at an upper side of the first straight-line portion (L1). The fifth straight-line portion (L5) is provided at a constant interval from the first straight-line portion (L1), whereby the fifth straight-line portion (L5) and the first straight-line portion (L1) prepare the first sound path (P1). The first sound path (P1) is in communication with the first opening (ON) of the cavity chamber (CC) so that a traveling direction of the rear sound wave emitted through the first opening (OP1) of the cavity chamber (CC) is changed to the first direction (X).

The sixth straight-line portion (L6) is bent from an end of the fifth straight-line portion (L5) while being parallel to the second straight-line portion (L2), and the sixth straight-line portion (L6) is disposed at a right side of the second straight-line portion (L2). The sixth straight-line portion (L6) is provided at a constant interval from the second straight-line portion (L2), whereby the sixth straight-line portion (L6) and the second straight-line portion (L2) prepare the second sound path (P2). The second sound path (P2) is in communication with the first sound path (P1) so that a traveling direction of the rear sound wave emitted through the first sound path (P1) is changed to the second direction (Y).

The seventh straight-line portion (L7) is bent from an end of the sixth straight-line portion (L6) while being parallel to the third straight-line portion (L3), and the seventh straight-line portion (L7) is disposed at a lower side of the third straight-line portion (L3). The seventh straight-line portion (L7) is provided at a constant interval from the third straight-line portion (L3), whereby the seventh straight-line portion (L7) and the third straight-line portion (L3) prepare the third sound path (P3). The third sound path (P3) is in communication with the second sound path (P2) so that a traveling direction of the rear sound wave emitted through the second sound path (P2) is changed to the first direction (X).

The eighth straight-line portion (L8) is bent from an end of the seventh straight-line portion (L7) while being parallel to the fourth straight-line portion (L4), and the eighth straight-line portion (L8) is disposed at a left side of the fourth straight-line portion (L4). The eighth straight-line portion (L8) is provided at a constant interval from the fourth straight-line portion (L4), whereby the eighth straight-line portion (L8) and the fourth straight-line portion (L4) prepare the fourth sound path (P4). The fourth sound path (P4) is in communication with the third sound path (P3) so that a traveling direction of the rear sound wave emitted through the third sound path (P3) is changed to the second direction (Y).

The ninth straight-line portion (L9) is bent from an end of the eighth straight-line portion (L8) while being parallel to the fifth straight-line portion (L5), and the ninth straight-line portion (L9) is disposed at an upper side of the fifth straight-line portion (L5). The ninth straight-line portion (L9) is provided at a constant interval from the fifth straight-line portion (L5), whereby the ninth straight-line portion (L9) and the fifth straight-line portion (L5) prepare the fifth sound path (P5). The fifth sound path (P5) is in communication with the fourth sound path (P4) so that a traveling direction of the rear sound wave emitted through the fourth sound path (P4) is changed to the first direction (X).

The tenth straight-line portion (L10) is bent from an end of the ninth straight-line portion (L10) while being parallel to the sixth straight-line portion (L6), and the tenth straight-line portion (L10) is disposed at a right side of the sixth straight-line portion (L6). The tenth straight-line portion (L10) is provided at a constant interval from the sixth straight-line portion (L6), whereby the tenth straight-line portion (L10) and the sixth straight-line portion (L6) prepare the sixth sound path (P6). The sixth sound path (P6) is in communication with the fifth sound path (P5) so that a traveling direction of the rear sound wave emitted through the fifth sound path (P5) is changed to the second direction (Y).

The eleventh straight-line portion (L11) is bent from an end of the tenth straight-line portion (L10) while being parallel to the seventh straight-line portion (L7), and the eleventh straight-line portion (L11) is disposed at a lower side of the seventh straight-line portion (L7). The eleventh straight-line portion (L11) is provided at a constant interval from the seventh straight-line portion (L7), whereby the eleventh straight-line portion (L11) and the seventh straight-line portion (L7) prepare the seventh sound path (P7). The seventh sound path (P7) is in communication with the sixth sound path (P6) so that a traveling direction of the rear sound wave emitted through the sixth sound path (P6) is changed to the rear sound emitting portion 700.

In this example embodiment of the present disclosure, the rear sound emission guide portion 900 surrounding the second vibration generating module 530 may be symmetric with the rear sound emission guide portion 900 surrounding the first vibration generating module 510 with respect to the central portion (CP) of the display panel 100. That is, the rear sound emission guide portion 900 surrounding the first vibration generating module 510 and the rear sound emission guide portion 900 surrounding the second vibration generating module 530 have the symmetric structures with respect to the central portion (CP) of the display panel 100.

In this example embodiment of the present disclosure, when the rear sound wave generated in the cavity chamber (CC) in accordance with the vibration of the display panel 100 by the driving of the vibration generating module 510 and 530 is emitted or transferred to the rear sound emitting portion 700, the rear sound wave is emitted or transferred in such a way that the traveling direction of the rear sound wave is changed by each of the first to seventh sound paths (P1~P7) from the cavity chamber (CC) to the first opening (OP1), whereby the rear sound wave is output to the front direction of the display panel 100 through the rear sound emitting portion 700 and the border gap (BG), to thereby improve the low-pitched frequency characteristics of the sound wave which is output from the display apparatus according to the embodiment of the present disclosure. In this case, a phase of the rear sound wave generated in the cavity chamber (CC) is inverted at 90° (or) 270° by a time delay in accordance with the length of each of the first to seventh sound paths P1~P7 (or transmission line principle), and is then output to the front direction of the display panel 100 through the border gap (BG).

Based on the transmission line principle, if the rear sound emission guide portion 900, that is, the length of the rear sound guide path 910 is the same as $\lambda/4$ wavelength of a resonant frequency of the vibration generating device 500, it may be possible to increase a low-pitched sound range generated in the vibration generating device 500. Thus, the length of the rear sound guide path 910 is set to be same as $\lambda/4$ wavelength of the resonant frequency of the vibration generating device 500. Accordingly, the length (m) of the rear sound emission guide portion 900 is set to 'm=(340/Ft)/4'. Herein, '340' indicates an initial velocity of the sound wave, 'Ft' indicates a reinforcement frequency (Hz), and '4' indicates $\lambda/4$ wavelength. For example, if reinforcing 100 Hz frequency of the sound wave output through the vibration of the display panel 100, the length (m) of the rear sound emission guide portion 900 is set to be 0.85 m.

Figure 8:
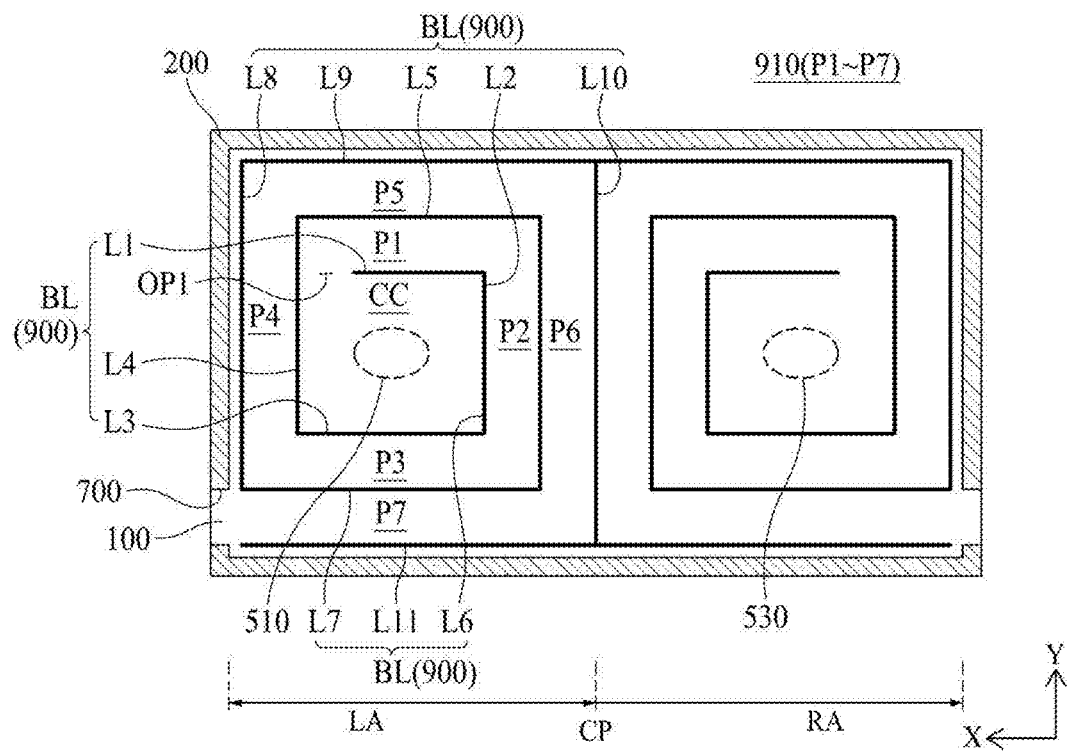
FIG. 8 illustrates a modified embodiment of the rear sound guide member shown in FIG. 7.

In the display apparatus according to the example embodiment of the present disclosure, the rear sound emission guide portion 900 surrounding the first vibration generating module 510 of the vibration generating device 500 and the rear sound emission guide portion 900 surrounding the second vibration generating module 530 of the vibration generating device 500 may share the tenth straight-line portion (L10), as shown in FIG. 8. In this case, it may be possible to reduce a material cost for the rear sound emission guide portion 900 in the display apparatus according to an example embodiment of the present disclosure.

Figure 9:
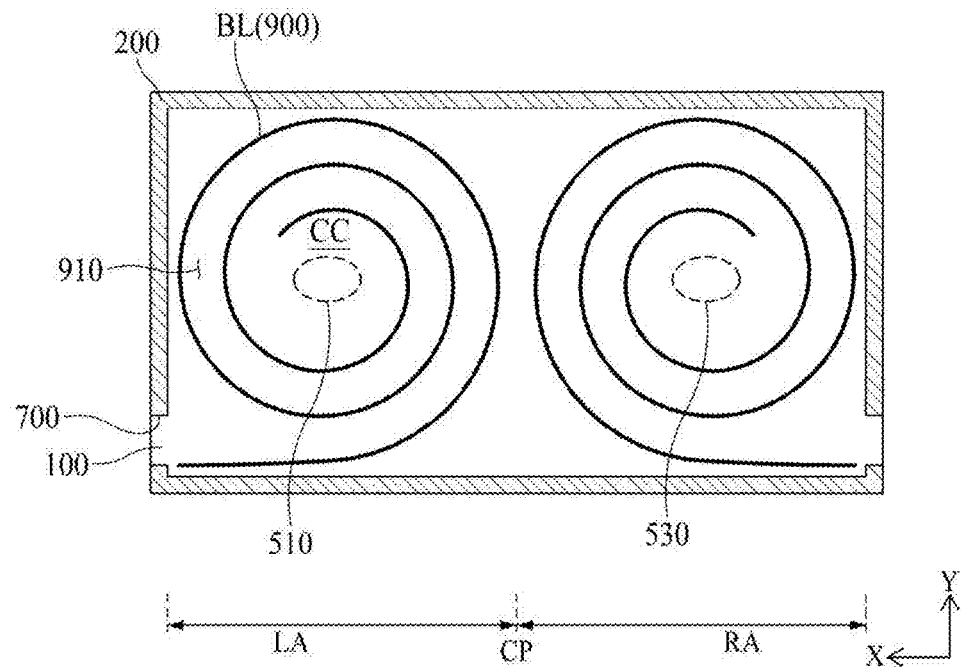
FIG. 9 illustrates another modified embodiment of the rear sound guide member shown in FIG. 7.

On the other hand, in the display apparatus according to the example embodiment of the present disclosure, the bulkhead line (BL) of each of the rear sound emission guide portion 900 surrounding the first vibration generating module 510 of the vibration generating device 500 and the rear sound emission guide portion 900 surrounding the second vibration generating module 530 of the vibration generating device 500 may have the spiral shape of the curved line, as shown in FIG. 9, to thereby prepare the rear sound guide path 910 of the spiral shape. Herein, the rear sound guide path 910 may be expressed as the rear sound guide pipe. For example, the bulkhead line (BL) having the spiral shape of the curved line may have the spiral shape of Archimedes with respect to the vibration generating device 500, that is, the vibration generating module 510 and 530.

The display apparatus according to the example embodiment of the present disclosure may enable realization of a wide low-pitched sound reproduction band and output of high pressure sound by the reinforcement interference between the front sound wave (FSW), which is output in accordance with the vibration of the display panel 100 and the rear sound wave (RSW), which is provided with the phase inverted by the rear sound emission guide portion 900 and is output to the front direction (FD) of the display panel 100 through the rear sound emitting portion 700.

Figure 10:
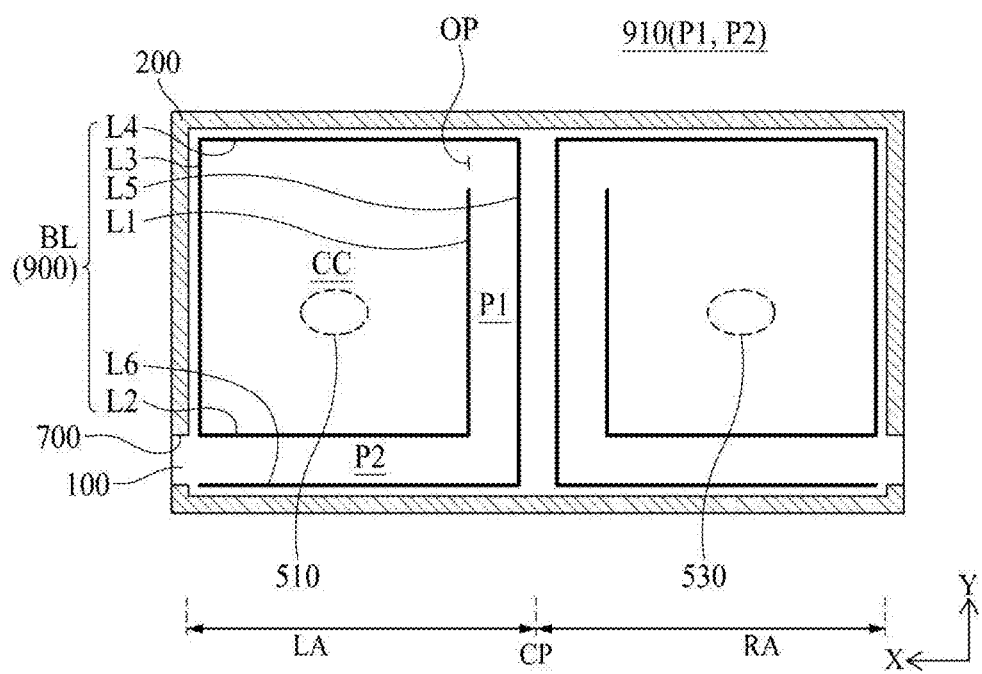
FIG. 10 illustrates a rear sound guide member according to another example embodiment of the present disclosure.

FIG. 10 illustrates a rear sound guide member according to another example embodiment of the present disclosure. With reference to FIG. 10 in connection with FIGS. 2 to 4, the rear sound emission guide portion 900 according to the example embodiment of the present disclosure may include a bulkhead line (BL) (or barrier line) of a spiral shape to surround each of the first vibration generating module 510 and the second vibration generating module 530.

The bulkhead line (BL) may have a constant width and height. For example, the bulkhead line (BL) may be formed of a double-sided tape or double-sided adhesion foam pad having a constant width and height. In this case, the height of the bulkhead line (BL) may be the same as the height of the panel adhesion member 200.

The bulkhead line (BL) according to an example embodiment of the present disclosure may include first to (n)th straight-line portions (L1~L6, herein, 'n' is an integer of 6 or more than 6) disposed in a spiral shape so as to surround the vibration generating module 510 and 530.

Among the first to (n)th straight-line portions (L1~L6), the (i+1)th straight-line portion (Li+1, herein, 'i' is an integer of 1~'n−1') is bent from an end of the (i)th straight-line portion (Li). The (i+1)th straight-line portion (Li+1) may be bent at 90° from an end of the (i)th straight-line portion (Li). In this case, a length of the (i+1)th straight-line portion (Li+1) is greater than a length of the (i)th straight-line portion (Li) so that the bulkhead line (BL) surrounds the vibration generating device 510 and 530, that is, a vibrating portion of the vibration generating module 510 and 530 in the spiral shape. Accordingly, the (i)th straight-line portion (Li) and the (i+2)th straight-line portion (Li+2) are disposed while being parallel to each other, and the (i+1)th straight-line portion (Li+1) and the (i+3)th straight-line portion (Li+3) are disposed while being parallel to each other. For example, a length of the (i+1)th straight-line portion (Li+1) may be larger than a length of the (i)th straight-line portion (Li) by an interval between the straight-line portions being adjacent to each other along the first direction (X) or second direction (Y). The odd-numbered straight-line portion among the first to (n)th straight-line portions (L1~L6) is parallel to the first direction X (or second direction Y), and the even-numbered straight-line portion among the first to (n)th straight-line portions (L1~L6) may be parallel to the second direction Y (or first direction X).

For example, the bulkhead line (BL) may include the first to sixth straight-line portions (L1~L6). As the first to sixth straight-line portions (L1~L6) are disposed to surround the vibration generating module 510 and 530 in the spiral shape, the bulkhead line (BL) prepares the rear sound guide path 910 of the spiral shape having first and second sound paths (P1, P2) with the different straight-line lengths. In this case, the rear sound guide path 910 may be expressed as a rear sound guide pipe, and the sound path (P1~P7) may be expressed as a sound pipe or duct.

Hereinafter, an arrangement structure of the rear sound emission guide portion 900 surrounding the straight-line portions of the vibrating portion 500a of the first vibration generating module 510 in the spiral shape, that is, the first to sixth straight-line portions (L1~L6) will be described in detail as follows.

The first straight-line portion (L1) is disposed at a right side of the first vibration generating module 510 while being parallel to the second direction (Y), the second straight-line portion (L2) is bent from an end of the first straight-line portion (L1) while being parallel to the first direction (X), and is disposed at a lower side of the first vibration generating module 510, the third straight-line portion (L3) is bent from an end of the second straight-line portion (L2) and is disposed at a left side of the first vibration generating module 510 while being parallel to the first straight-line portion (L1) under the condition that the first vibration generating module 510 is disposed in-between, and the fourth straight-line portion (L4) is bent from an end of the third straight-line portion (L3) and is disposed at an upper side of the first vibration generating module 510 while being parallel to the second straight-line portion (L2) under the condition that the first vibration generating module 510 is disposed in-between. Each of the first to fourth straight-line portions (L1, L2, L3, L4) is disposed at the same interval from the first vibration generating module 510 to surround once the first vibration generating module 510, to thereby prepare a cavity chamber (CC) in the periphery of the first vibration generating module 510. In this case, the cavity chamber (CC) has a first opening (OP1) prepared between the first straight-line portion (L1) and the fourth straight-line portion (L4) so that the cavity chamber (CC) has a case shape whose right upper portion is partially open on a plane structure. Accordingly, the rear sound wave generated in the cavity chamber (CC) in accordance with the vibration of the display panel 100 by the driving of the first vibration generating module 510 may be emitted or transferred from the cavity chamber (CC) to the rear sound emitting portion 700 through the first opening (OP1). Herein, the cavity chamber (CC) may be defined as a volume of Helmholtz resonator.

The fifth straight-line portion (L5) is bent from an end of the fourth straight-line portion (L4) while being parallel to the first straight-line portion (L1), and the fifth straight-line portion (L5) is disposed at a right side of the first straight-line portion (L1). The fifth straight-line portion (L5) is provided at a constant interval from the first straight-line portion (L1), whereby the fifth straight-line portion (L5) and the first straight-line portion (L1) prepare the first sound path (P1). The first sound path (P1) is in communication with the first opening (ON) of the cavity chamber (CC) so that a traveling direction of the rear sound wave emitted through the first opening (ON) of the cavity chamber (CC) is changed to the second direction (Y).

The sixth straight-line portion (L6) is bent from an end of the fifth straight-line portion (L5) while being parallel to the second straight-line portion (L2), and the sixth straight-line portion (L6) is disposed at a lower side of the second straight-line portion (L2), and is connected with the rear sound emitting portion 700. The sixth straight-line portion (L6) is provided at a constant interval from the second straight-line portion (L2), whereby the sixth straight-line portion (L6) and the second straight-line portion (L2) prepare the second sound path (P2). The second sound path (P2) is in communication with the first sound path (P1) so that a traveling direction of the rear sound wave emitted through the first sound path (P1) is changed to the rear sound emitting portion 700.

The first sound path (P1) and the second sound path (P2) extend from the first opening (OP1) of the cavity chamber (CC), whereby an entire length of the first sound path (P1) and the second sound path (P2) may be defined by a length of an opening of Helmholtz resonator. The first opening (OP) and the first and second sound paths (P1, P2) having the same width and height are connected with each other so that a cross sectional area of the first opening (OP1) may be defined as a hole area of Helmholtz resonator.

In this example embodiment of the present disclosure, the rear sound emission guide portion 900 surrounding the second vibration generating module 530 may be symmetric with the rear sound emission guide portion 900 surrounding the first vibration generating module 510 with respect to the central portion (CP) of the display panel 100. That is, the rear sound emission guide portion 900 surrounding the first vibration generating module 510 and the rear sound emission guide portion 900 surrounding the second vibration generating module 530 have symmetric structures with respect to the central portion (CP) of the display panel 100.

In this example embodiment of the present disclosure, when the rear sound wave generated in the cavity chamber (CC) in accordance with the vibration of the display panel 100 by the driving of the vibration generating module 510 and 530 is amplified by the resonance of the rear sound emission guide portion 900, that is, the rear sound guide pipe, and the phase of the amplified rear sound wave is inverted, and is then emitted to the front direction of the display panel 100 through the rear sound emitting portion 700 and the border gap, it may possible to improve the low-pitched frequency characteristics of the sound wave which is output from the display apparatus according to the example embodiment of the present disclosure. In this case, the resonant frequency of the rear sound emission guide portion 900 and the length of the rear sound emission guide portion 900 may be measured by the following Equation 1.

$$f = \frac{c}{2\pi}\sqrt{\frac{A}{Vl}} \quad l = \left(\frac{c}{2\pi}\right)^2 \frac{A}{Vf^2} \qquad \text{[Equation 1]}$$

In the above Equation 1, 'f' indicates the resonant frequency, 'A' indicates the cross sectional area of the pipe, 'l' indicates the length of the pipe, 'V' indicates the volume of the cavity chamber, and 'c' indicates the velocity of the sound wave (340 m/sec at 15° C., increased by 0.6 m when the temperature is increased by 1° C.).

In the above Equation 1, the resonant frequency of the rear sound emission guide portion 900 is proportional to the cross sectional area (A) of the pipe. That is, when the pipe has the small cross sectional area, it has low sound. When the cavity chamber has the large volume (V) and the pipe has the large length, it has the low frequency.

The rear sound emission guide portion 900 according to an example embodiment of the present disclosure amplifies the rear sound by the use of resonance of the pipe, inverts the amplified rear sound, and then outputs the rear sound to the front direction of the display panel 100 through the border gap, to thereby reinforce the frequency characteristics of the low-pitched sound band.

In the display apparatus according to the example embodiment of the present disclosure, the rear sound emission guide portion 900 surrounding the first vibration generating module 510 of the vibration generating device 500 and the rear sound emission guide portion 900 surrounding the second vibration generating module 530 of the vibration generating device 500 may share the fifth straight-line portion (L5). In this case, it may possible to reduce a material cost for the rear sound emission guide portion 900 in the display apparatus according to the example embodiment of the present disclosure.

Figure 11:
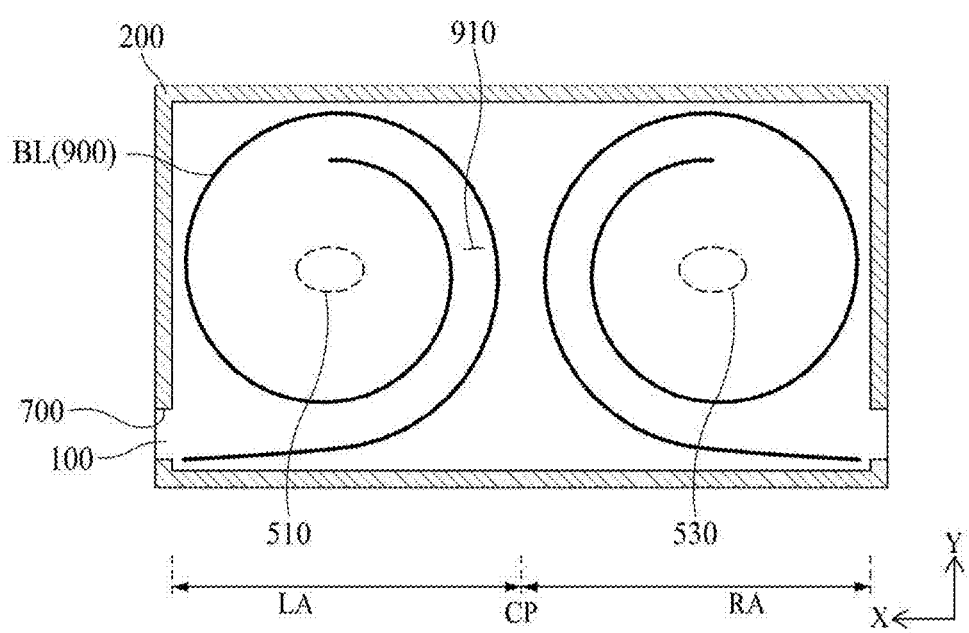
FIG. 11 illustrates a modified embodiment of the rear sound guide member shown in FIG. 10.

On the another hand, in the display apparatus according to the example embodiment of the present disclosure, the bulkhead line (BL) of each of the rear sound emission guide portion 900 surrounding the first vibration generating module 510 of the vibration generating device 500 and the rear sound emission guide portion 900 surrounding the second vibration generating module 530 of the vibration generating device 500 may have the spiral shape of the curved line, as shown in FIG. 11. For example, the bulkhead line (BL) having the spiral shape of the curved line may have the spiral shape of Archimedes with respect to the vibration generating device 500, that is, the vibration generating module 510 and 530.

The display apparatus according to the example embodiment of the present disclosure enables realization of the wide low-pitched sound reproduction band and output of the high pressure sound by the reinforcement interference between the front sound wave (FSW), which is output in accordance with the vibration of the display panel 100 and the rear sound wave (RSW), which is provided with the phase inverted by the rear sound emission guide portion 900 and is output to the front direction (FD) of the display panel 100 through the rear sound emitting portion 700.

Features, structures and effects of the above example embodiment of the present disclosure are included in at least one embodiment of the present disclosure, but are not limited to one embodiment of the present disclosure. Furthermore, the features, structures and effects described in at least one embodiment of the present disclosure may be variously inter-operated with each other and driven technically as those skilled in the art can sufficiently understand. Thus, it is to be understood that the inter-operated modifications and variations are included within the scope of the present disclosure.

According to one or more embodiments of the present disclosure, the display apparatus comprises the display panel configured to display an image, the rear surface structure configured to surround lateral and rear surfaces of the display panel, the vibration generating device connected with the rear surface structure and configured to vibrate the display panel, the rear sound emitting portion prepared between the display panel and the rear surface structure, and the rear sound guide member prepared between the display panel and the rear surface structure so as to surround the vibration generating device in the spiral shape and configured to connect with the rear sound emitting portion.

According to one or more embodiments of the present disclosure, the rear sound guide member surrounds the vibration generating device at least one time.

According to one or more embodiments of the present disclosure, the rear sound guide member includes the bulkhead line disposed in the spiral shape of the straight line or curved line so as to surround the vibration generating device.

According to one or more embodiments of the present disclosure, the bulkhead line includes a double-sided tape or double-sided adhesion foam pad having a constant width and height.

According to one or more embodiments of the present disclosure, the front surface of the bulkhead line is attached to the rear surface of the display panel, and the rear surface of the bulkhead line is attached to the rear surface structure.

According to one or more embodiments of the present disclosure, the bulkhead line includes first to (n)th straight-line portions (herein, 'n' is an integer of 5 or more than 5), and the (i+1)th straight-line portion (herein, 'i' is an integer of 1~'n–1') is bent from an end of the (i)th straight-line portion.

According to one or more embodiments of the present disclosure, the length of the (i+1)th straight-line portion is greater than the length of the (i)th straight-line portion, the (i)th straight-line portion and the (i+2)th straight-line portion are parallel to each other, and the (i+1)th straight-line portion and the (i+3)th straight-line portion are parallel to each other.

According to one or more embodiments of the present disclosure, the odd-numbered straight-line portion among the first to (n)th straight-line portions is parallel to the first direction, and the even-numbered straight-line portion among the first to (n)th straight-line portions is parallel to the second direction which is perpendicular to the first direction.

According to one or more embodiments of the present disclosure, the bulkhead line has the spiral shape of Archimedes with respect to the vibration generating device.

According to one or more embodiments of the present disclosure, the bulkhead line includes first to sixth straight-line portions, and the (i+1)th straight-line portion is bent from an end of the (i)th straight-line portion.

According to one or more embodiments of the present disclosure, the length of the (i+1)th straight-line portion is greater than the length of the (i)th straight-line portion, the (i)th straight-line portion and the (i+2)th straight-line portion are parallel to each other, and the (i+1)th straight-line portion and the (i+3)th straight-line portion are parallel to each other.

According to one or more embodiments of the present disclosure, the odd-numbered straight-line portion among the first to sixth straight-line portions is parallel to the second direction, and the even-numbered straight-line portion among the first to sixth straight-line portions is parallel to the first direction which is perpendicular to the second direction.

According to one or more embodiments of the present disclosure, the phase of the rear sound wave which is output through the rear sound emitting portion is the same as the phase of the front sound wave which is output from the display panel in accordance with the vibration of the display panel.

According to one or more embodiments of the present disclosure, the vibration generating device includes the first vibration generating module configured to vibrate a left area of the display panel, and the second vibration generating module configured to vibrate a right area of the display panel, wherein the rear sound guide member surrounds each of the first vibration generating module and the second vibration generating module.

According to one or more embodiments of the present disclosure, the display apparatus further comprises the border gap prepared between the rear surface structure and the lateral surface of the display panel, wherein the rear surface structure includes the rear surface cover portion provided with a gap space in-between and configured to cover the rear surface of the display panel, and the lateral surface cover portion provided with a border gap in-between and formed in the edge of the rear surface cover portion so as to surround each lateral surface of the display panel.

According to one or more embodiments of the present disclosure, the display apparatus further comprises the panel connection member interposed between the rear edge of the display panel and the front edge of the rear surface structure, wherein the rear sound emitting portion is formed by removing some areas of the panel connection member, and the border gap is connected with the rear sound guide member through the rear sound emitting portion.

According to one or more embodiments of the present disclosure, the rear surface structure further includes the rounding portion prepared between the lateral surface cover portion and the rear surface cover portion.

According to one or more embodiments of the present disclosure, lateral surface cover portion is inclined at 90°~145° on the edge of the rear surface cover portion.

According to an example embodiment of the present disclosure, a display apparatus may include a display panel configured to display an image by emitting light, a rear surface structure configured to surround lateral and rear surfaces of the display panel, a vibration generating device connected with the rear surface structure and configured to vibrate the display panel, a rear sound emitting portion between the display panel and the rear surface structure, and a rear sound guide between the display panel and the rear surface structure to surround the vibration generating device in a spiral shape and configured to connect with the rear sound emitting portion.

Furthermore, the rear sound emitting portion may be configured to discharge air between the display panel and the rear surface structure.

Also, the rear sound guide may surround the vibration generating device at least one time.

In addition, the rear sound guide may include a bulkhead line disposed in the spiral shape, and the spiral shape may be formed of straight lines or a curved line to surround the vibration generating device.

Furthermore, the bulkhead line may include a double-sided tape or a double-sided adhesion foam pad having a constant width and height.

Also, a front surface of the bulkhead line may be attached to the rear surface of the display panel, and a rear surface of the bulkhead line may be attached to the rear surface structure.

In addition, the bulkhead line may include first to (n)th straight-line portions, and the (i+1)th straight-line portion may be bent from an end of the (i)th straight-line portion, wherein 'n' is an integer of 5 or more than 5, and 'i' is an integer of 1 to 'n−1'.

Furthermore, a length of the (i+1)th straight-line portion may be greater than a length of the (i)th straight-line portion, the (i)th straight-line portion and the (i+2)th straight-line portion may be parallel to each other, and the (i+1)th straight-line portion and the (i+3)th straight-line portion may be parallel to each other.

Also, the odd-numbered straight-line portions among the first to (n)th straight-line portions may be parallel to a first direction, and the even-numbered straight-line portions among the first to (n)th straight-line portions may be parallel to a second direction which is perpendicular to the first direction.

In addition, the bulkhead line may have the spiral shape of Archimedes with respect to the vibration generating device.

Furthermore, 'n' may be 6.

Also, a phase of a rear sound wave which is output through the rear sound emitting portion may be the same as a phase of a front sound wave which is output from the display panel in accordance with a vibration of the display panel as vibrated by the vibration generating device.

In addition, the vibration generating device may include a first vibration generating module configured to vibrate a left area of the display panel, and a second vibration generating module configured to vibrate a right area of the display panel, wherein the rear sound guide surrounds each of the first vibration generating module and the second vibration generating module.

Furthermore, the display apparatus may further include a border gap between the rear surface structure and the lateral surface of the display panel, wherein the rear surface structure may include a rear surface cover portion with a gap space in-between and configured to cover the rear surface of the display panel, and a lateral surface cover portion with the border gap in-between and connected to an edge of the rear surface cover portion to surround the lateral surface of the display panel.

Also, the display apparatus may further include a panel connection member interposed between a rear edge of the display panel and a front edge of the rear surface cover portion, wherein the rear sound emitting portion is formed by removing some areas of the panel connection member, and the border gap is connected with the rear sound guide member through the rear sound emitting portion.

In addition, wherein the rear surface structure may further include a rounding portion between the lateral surface cover portion and the rear surface cover portion.

Furthermore, the lateral surface cover portion may be inclined at 90° ~145° relative to the rear surface cover portion.

Accordingly, the display apparatus according to example embodiments of the present invention is capable of outputting sound to a region in front of the display panel and capable of realizing the wide low-pitched sound reproduction band and outputting the sound wave with the high sound pressure level.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A display apparatus, comprising:
    a display panel configured to display an image;
    a support structure on a rear surface of the display panel;
    a vibration generating device on the rear surface of the display panel and configured to vibrate the display panel; and
    a partition between the display panel and the support structure, the partition surrounding the vibration generating device and having a spiral shape,
    wherein the partition includes a barrier line, and the barrier line includes first to (n)th straight-lines having different lengths.

2. The display apparatus according to claim 1, further comprising:
    a sound generating portion between the display panel and the support structure; and
    a border gap between the support structure and a lateral surface of the display panel.

3. The display apparatus according to claim 2, further comprising:
    a gap between the support structure and the lateral surface of the display panel,
    wherein the sound generating portion is configured to discharge air through the gap between the lateral surface of the display panel and the support structure towards a front direction of the display panel.

4. The display apparatus according to claim 2, wherein a phase of a rear sound wave that is output through the sound generating portion is the same as a phase of a front sound wave that is output from the display panel based on a vibration of the display panel as vibrated by the vibration generating device.

5. The display apparatus according to claim 2, wherein the support structure includes:
    a first portion on the rear surface of the display panel, wherein a gap space is prepared between the first portion and the rear surface of the display panel; and
    a second portion on a periphery of the first portion and the lateral surface of the display panel, wherein a border gap is prepared between the second portion and the lateral surface of the display panel.

6. The display apparatus according to claim 5, further comprising:
    a panel connection member between a first periphery of the display panel and a second periphery of the first portion.

7. The display apparatus according to claim 5, wherein the support structure further includes a rounding portion between the first portion and the second portion.

8. The display apparatus according to claim 5, wherein the second portion is inclined at 90°~145° relative to the first portion.

9. The display apparatus according to claim 1, wherein the partition encloses the vibration generating device at least one time.

10. The display apparatus according to claim 1, wherein the barrier line includes a double-sided tape or a double-sided adhesion foam pad.

11. The display apparatus according to claim 1, wherein a front surface of the barrier line is on the rear surface of the display panel and a rear surface of the barrier line is on the support structure.

12. The display apparatus according to claim 1, wherein the (i+1)th straight-line portion is bent from an end of the (i)th straight-line portion, wherein 'n' is an integer of 5 or more than 5, and 'i' is an integer of 1 to 'n−1'.

13. The display apparatus according to claim 12, wherein a length of the (i+1)th straight-line portion is greater than a length of the (i)th straight-line portion, the (i)th straight-line portion and the (i+2)th straight-line portion are parallel to each other, and the (i+1)th straight-line portion and the (i+3)th straight-line portion are parallel to each other.

14. The display apparatus according to claim 13, wherein the odd-numbered straight-line portions among the first to (n)th straight-line portions are parallel to a first direction, and the even-numbered straight-line portions among the first to (n)th straight-line portions are parallel to a second direction which is perpendicular to the first direction.

15. The display apparatus according to claim 14, wherein 'n' is 6.

16. The display apparatus according to claim 13, wherein 'n' is 6.

17. The display apparatus according to claim 12, wherein 'n' is 6.

18. The display apparatus according to claim 1, wherein the vibration generating device includes:
    a first vibration generating module configured to vibrate a first area of the display panel; and
    a second vibration generating module configured to vibrate a second area of the display panel,
    wherein the partition encloses each of the first vibration generating module and the second vibration generating module.

19. The display apparatus according to claim 18, wherein the partition of the first vibration generating module is symmetric with the partition of the second vibration generating module.

20. The display apparatus according to claim 1, further comprising a heat dissipation member between the display panel and the vibration generating device.

21. The display apparatus according to claim 1, further comprising a sound generating portion between the display panel and the support structure.

22. A display apparatus, comprising:
    a display panel configured to display an image;
    a support structure disposed on lateral and rear surfaces of the display panel;
    a vibration generating device disposed on the support structure and configured to vibrate the display panel; and a partition between the display panel and the support structure to enclose the vibration generating device, wherein the partition includes a barrier line, wherein the barrier line includes first to (n)th straight-line portions, and the (i+1)th straight-line portion is bent from an end of the (i)th straight-line portion, wherein 'n' is an integer of 5 or more than 5, and 'i' is an integer of 1 to 'n−1'.

23. The display apparatus according to claim 22, further comprising:

a sound generating portion between the display panel and the support structure.

* * * * *